United States Patent
Dai et al.

(10) Patent No.: US 12,415,623 B2
(45) Date of Patent: Sep. 16, 2025

(54) TRANSFORMABLE AND IN-ORBIT MANUFACTURABLE SPACE DEBRIS COLLECTOR

(71) Applicant: Purdue Research Foundation, West Lafayette, IN (US)

(72) Inventors: Ran Dai, West Lafayette, IN (US); Yuto Tanaka, West Lafayette, IN (US); Aditya Arjun Anibha, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/588,418

(22) Filed: Feb. 27, 2024

(65) Prior Publication Data
US 2024/0286767 A1     Aug. 29, 2024

Related U.S. Application Data

(60) Provisional application No. 63/448,947, filed on Feb. 28, 2023.

(51) Int. Cl.
*B64G 1/10* (2006.01)
*B64G 1/22* (2006.01)

(52) U.S. Cl.
CPC ......... *B64G 1/1081* (2023.08); *B64G 1/2224* (2023.08)

(58) Field of Classification Search
CPC ...... B64G 1/1081; B64G 1/2224; B64G 4/00; B64G 99/00; B64G 1/407; B64G 1/44
See application file for complete search history.

(56) References Cited

U.S. PATENT DOCUMENTS

| | | | | |
|---|---|---|---|---|
| 3,525,483 A | * | 8/1970 | Alstyne | B64G 1/2224 244/172.6 |
| 8,132,762 B2 | * | 3/2012 | Huang | B64G 1/2224 244/172.7 |
| 11,142,349 B2 | * | 10/2021 | Barnes | B64G 1/222 |
| 11,958,637 B2 | * | 4/2024 | Sippel | B64G 1/2228 |
| 2007/0145195 A1 | * | 6/2007 | Thomson | B64G 1/2222 244/172.6 |

OTHER PUBLICATIONS

Del Grosso, A. E. et al., "Adaptive building skin structures," Smart Materials and Structures, vol. 19, No. 12, 12pp, (2010).
(Continued)

*Primary Examiner* — Joshua D Huson
*Assistant Examiner* — Vicente Rodriguez
(74) *Attorney, Agent, or Firm* — Purdue Research Foundation

(57) ABSTRACT

A material collection system includes a planar structure, at least one actuator, and a plurality of pull cables. The planar structure includes a plurality of interconnected geometric panels having a plurality of holes therethrough, and each interconnection between two geometric panels defines a foldable coupling. The plurality of pull cables pass through the holes such that a first end of each pull cable is coupled with at least one geometric panel and a second end of each pull cable is coupled with the at least one actuator. The planar structure is operable between a first stable geometric state and a second stable geometric state. An actuation to pull each of the plurality of pull cables transitions the planar structure between the first stable geometric state and the second stable geometric state.

20 Claims, 17 Drawing Sheets

(56) References Cited

OTHER PUBLICATIONS

Zirbel, S. A. et al., "Accommodating thickness in origami-based deployable arrays," Journal of Mechanical Design, vol. 135, No. 11, 111005-11 (Nov. 2013); published online Oct. 3, 2013.
Miura, K., "Map fold a la Miura style, its physical characteristics and application to the space science," pp. 77-90, (1994); paper was presented at the First International Meeting of Origami Science and Technology, Ferrara, Italy, Dec. 6-7, 1989; available online at https://library.katachi-jp.com/rpf/pdf/chap2/0077.pdf.
Felton, S. et al., "Applied Origami: A method for building self-folding machines," Science, Research Reports, vol. 345, No. 6197, pp. 644-646, Aug. 8, 2014.
Rodrigues, G. V. et al., "Nonlinear dynamics of an adaptive origami-stent system," International Journal of Mechanical Sciences, vol. 133, pp. 303-318, (2017); available online Sep. 1, 2017.
Jianguo, C. et al., "Bistable behavior of the cylindrical origami structure with Kresling pattern," Journal of Mechanical Design, vol. 137, No. 6, pp. 061406-1-061406-8, (2015); published online Apr. 21, 2015.
Lu, L. et al., "Conical Kresling origami and its applications to curvature and energy programming," Proceedings of the Royal Society A, vol. 477: 20210712 (2021); available online at https://doi.org/10.1098/rspa.2021.0712.
Sivaperuman-Kalairaj, M. et al., "Untethered origami worm robot with diverse multi-leg attachments and responsive motions under magnetic actuation," Robotics, vol. 10, 118, 12 pgs., (2021); available online at https://doilorg/10.3390/robotics10040118.
Martinez. R. V. et al., "Elastomeric origami: programmable paper-elastomer composites as pneumatic actuators," Advanced Functional Materials, vol. 22, No. 7, pp. 1376-1384, (2012).
Onal, C. D. et al., "Towards printable robotics: Origami-inspired planar fabrication of three-dimensional mechanisms," in 2011 IEEE International Conference on Robotics and Automation, Shanghai, China, May 9-13, 2011, pp. 4608-4613.
Liu, T. et al., "Three-dimensional printable origami twisted tower: design, fabrication, and robot embodiment," IEEE Robotics and Automation Letters, vol. 3, No. 1, pp. 116-123, (Jan. 2018); date of publication Jul. 31, 2017.

\* cited by examiner

TRANSFORMABLE AND IN-ORBIT MANUFACTURABLE SPACE DEBRIS COLLECTOR

CROSS-REFERENCE TO RELATED APPLICATIONS

This application is related to and claims the priority benefit of U.S. Provisional Patent Application No. 63/448,947, entitled "Transformable and In-Orbit Manufacturable Space Debris Collector," filed Feb. 28, 2023, the contents of which are hereby incorporated by reference in their entirety into the present disclosure.

GOVERNMENT SUPPORT CLAUSE

This invention was made with government support under Grant No. 2201568 awarded by the National Science Foundation. The government has certain rights in the invention.

TECHNICAL FIELD

The invention relates to outer space debris collection, and particularly to foldable and in-orbit manufacturable outer space debris collection systems.

BACKGROUND

This section introduces aspects that may help facilitate a better understanding of the disclosure. Accordingly, these statements are to be read in this light and are not to be understood as admissions about what is or is not prior art.

The proliferation of space debris around Earth has reached significant proportions, driven by the relentless expansion of human space exploration endeavors. Left unaddressed, this surge in space debris poses a risk to space travel and operations, particularly in low Earth orbit. Many approaches have been devised to mitigate this looming threat, predominantly focused on deorbiting techniques such as tethered systems, harpoons, laser-ion beams, deployable small sats, net capture, and robotic arms. These methods generally involve either physically attaching to or actively propelling debris out of orbit.

However, a common limitation among these strategies is their inability to effectively address space debris of various sizes, ranging from minuscule particles to larger objects exceeding one meter in diameter. The sheer volume of space debris necessitates a high quantity of debris collectors, particularly in cases where they are not designed for reuse. This presents logistical challenges, including multiple launches for transporting large-volume instruments into space and the potential generation of additional debris in the event of collector failures.

SUMMARY

The present disclosure describes a foldable space debris collector which overcomes the limitations of existing space debris collection systems. Particularly, the described foldable space debris collector is compact during launch, manufacturable in space, and deployable when required.

In one embodiment, a material collection system can be operable in low gravity or anti-gravity environments. The system can include a planar structure including a plurality of interconnected geometric panels, at least one actuator, and a plurality of pull cables. Each interconnection between two geometric panels can define a foldable coupling, and the planar structure can define a plurality of holes therethrough. Each pull cable of the plurality of pull cables can pass through at least one hole of the plurality of holes. A first end of each pull cable can be coupled with at least one geometric panel and a second end of each pull cable can be coupled with the at least one actuator. As such, the planar structure can be operable between a first stable geometric state and a second stable geometric state. An actuation of the at least one actuator to pull each of the plurality of pull cables can then be operable to transition the planar structure between the first stable geometric state and the second stable geometric state.

In some embodiments, each geometric panel can be formed of a first material and each foldable coupling can be formed of a second material. The first material can include polylactic acid (PLA) and the second material can include thermoplastic polyurethane (TPU), and they can be joined together using one or more dovetail joints. In still some embodiments, the planar structure can be shaped to form a conical Kresling pattern once assembled.

In additional embodiments, the at least one actuator can include a plurality of servo motors. The number of servo motors can equal the amount of the plurality of pull cables, and each of the plurality of pull cables can be configured to apply an equal amount of torque during the transition between the first stable geometric state and the second stable geometric state. Additionally, the pull cables can be configured to pull in a linear path during the transition between the first stable geometric state and the second stable geometric state.

In other embodiments, a method of configuring a debris collection system is described. The method can include forming the planar structure having opposing ends, with each interconnection between two geometric panels being capable of defining a foldable coupling, and with the plurality of interconnected geometric panels having a plurality of holes formed therethrough. The method can further include additional acts such as coupling together the opposing ends of the planar structure, inserting a respective one of the plurality of pull cables through each of the plurality of holes formed through the planar structure, and attaching a first end of each respective pull cable to at least one geometric panel of the plurality of interconnected geometric panels and a second end of each respective pull cable to the at least one actuator. In some embodiments, the method can further include calculating a panel geometry for each of the plurality of interconnected geometric panels and calculating a plurality of hole locations for each of the plurality of holes prior to forming the planar structure.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1A:
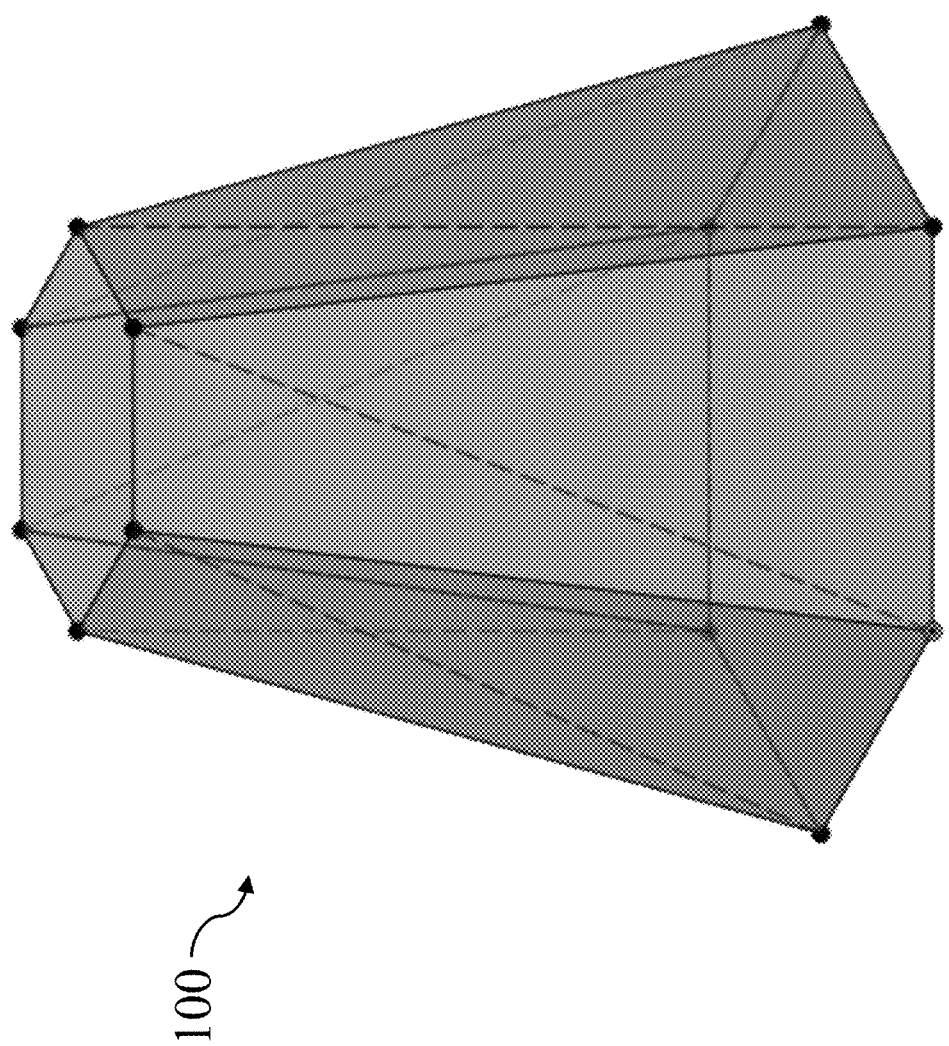
FIG. 1A depicts a schematic view of one example of a conical Kresling debris collection structure having two stable states, showing the structure in a deployed (i.e., unfolded) state.

The drawings are not intended to be limiting in any way, and it is contemplated that various embodiments of the technology may be carried out in a variety of other ways, including those not necessarily depicted in the drawings.

The accompanying drawings incorporated in and forming a part of the specification illustrate several aspects of the present technology, and together with the description serve to explain the principles of the technology; it being understood, however, that this technology is not limited to the precise arrangements shown, or the precise experimental arrangements used to arrive at the various graphical results shown in the drawings.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Overview

Origami-inspired foldable space debris collectors, as described herein, offer a promising remedy to the limitations and challenges experienced by existing space debris collection systems. The origami-inspired foldable space debris collectors described provide a unique ability to fold into a compact configuration prior to deployment, which not only conserves valuable payload space but also allows for the simultaneous launch and deployment of multiple collectors. Further, their flexibility enables them to expand to accommodate additional debris storage and adapt their structure to securely trap debris using origami-like apertures of variable sizes.

The advantages of origami structures extend beyond space debris collection. Origami, the art of folding a flat sheet of paper into a three-dimensional (3D) sculpture along predefined creases, has found numerous applications across diverse fields, including architecture, aerospace, robotics, and medical devices. In space operations, where each launch incurs high costs associated with limited mass and volume capacity, deployable systems capable of adapting their shape or function in situ offer a compelling solution to meet the demands of future space endeavors.

Among various origami patterns, the Kresling pattern stands out as a foldable structure created by subjecting a thin cylindrical shell to torsion. Twisting and folding the Kresling structure generates a diaphragm perpendicular to the tube axis. While traditional Kresling patterns exhibit limitations in radial closure, the conical Kresling pattern, with enhanced degrees of freedom, emerges as one ideal candidate for constructing a space debris collector capable of radial closure. In addition to its space-saving characteristics, the Kresling pattern is renowned for efficiently absorbing energy impacts from specific directions, making it a suitable choice for trapping debris in an enclosed space. Given the paramount importance of energy conservation in space operations, the design of the Kresling origami structure described in the present disclosure not only emphasizes the enclosure volume for capturing and retaining debris but also minimizes the energy required for folding and unfolding the origami structure.

The functionality of an origami-inspired system can include a well-controlled actuation system for selectively folding and unfolding the system. While traditional actuation mechanisms such as magnetic and pneumatic actuators have proven effective in Earth environments and could be integrated into the present system, they present some impracticalities in spaceflight conditions due to extreme temperature variations and a lack of infrastructure for deployment. To address these challenges, an energy efficient Kresling pattern-based space debris collector equipped with an autonomous actuation system has been developed and described herein, enabling autonomous or remote-controlled folding and deployment.

II. Exemplary Debris Collection Systems

A. Conical Kresling Patterned Geometric Model

Figure 1B:
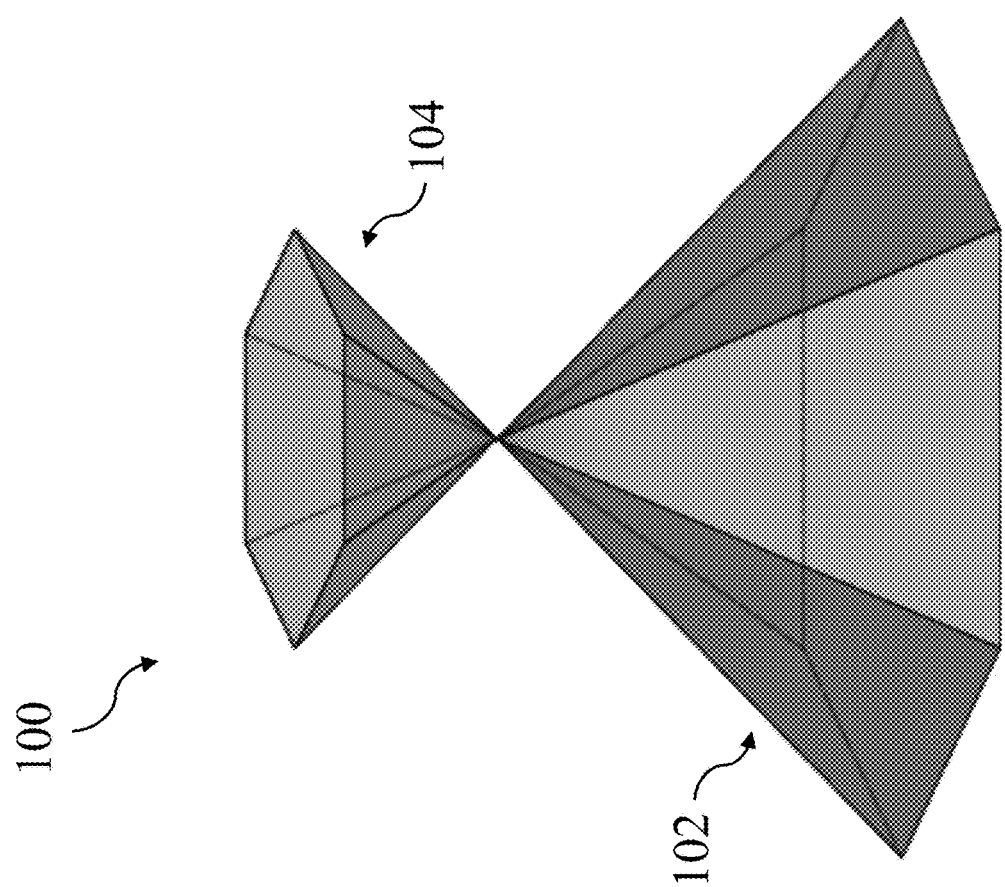
FIG. 1B depicts a schematic view of the conical Kresling structure of FIG. 1A, showing the structure in a undeployed (i.e., folded) state.

The conical Kresling pattern of the debris collection system (100) is characterized by a set of interrelated parameters governed by coupling constraints, collectively defining its shape, dimensions, and folding configurations. When fully folded, this pattern exhibits distinctive features, as illustrated in FIG. 1B. The lower part (102) forms an enclosure volume capable of housing collected debris, while the upper part (104) serves as a valve, sealing the accumulated debris within the enclosure. These inherent characteristics align with the requirements of a deployable debris collector, which necessitates the ability to transition between a fully deployed state for debris capture, as shown in FIG. 1A, and a folded state for efficient storage, as shown in FIG. 1B.

Figure 2A:
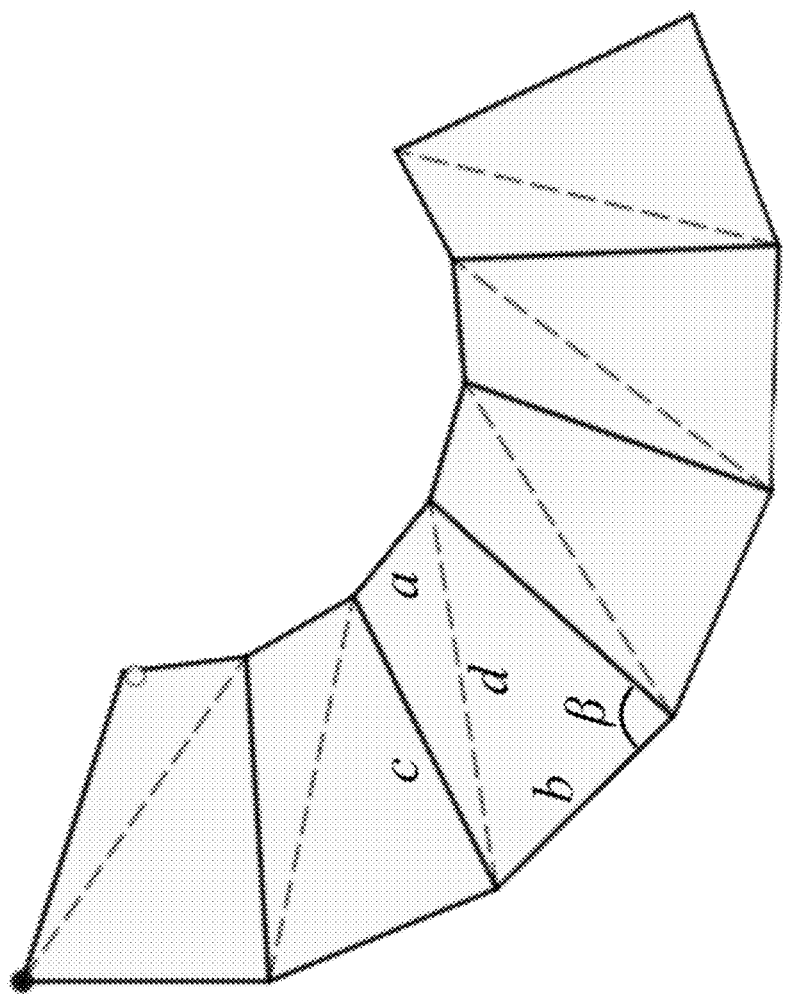
FIG. 2A depicts a schematic view of one example of a geometric model representative of the conical Kresling pattern of FIG. 1A, showing the model without hinges.

At the fundamental level, a Kresling pattern consists of a convex quadrilateral cell. This unit cell is defined by several key parameters, as shown in FIG. 2A. Specifically, the four essential parameters are denoted as a, b, c, and $\beta$, where a, b, and c represent the lengths of the quadrilateral's sides, and $\beta$ represents the angle between sides c and b. The length of the diagonal, labeled as d, can be determined using these parameters, expressed as $$d = \sqrt{b^2 + c^2 - 2bc\cos(\beta)}.$$

Figure 2B:
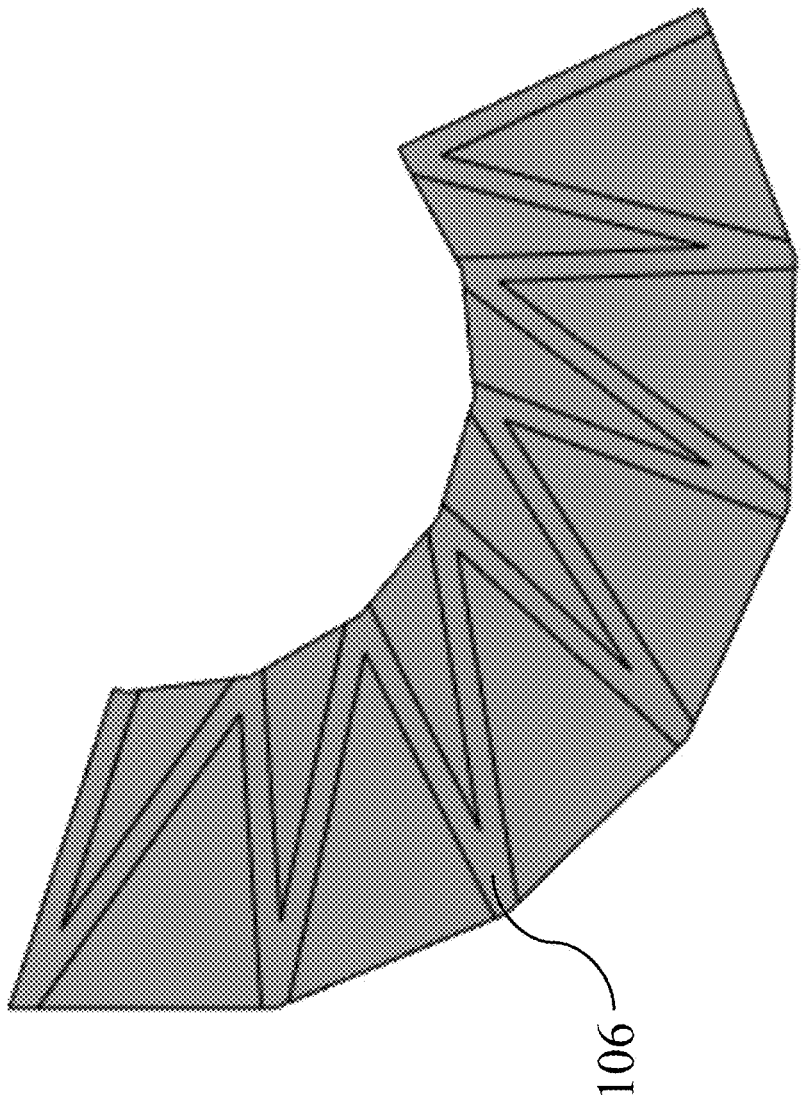
FIG. 2B depicts a schematic view of the model of FIG. 2A, showing the model with hinges.

In this context, side c corresponds to the mountain crease, while the diagonal d corresponds to the valley crease. To enable the foldability of each unit cell, the geometric model incorporates a hinge mechanism (106), as illustrated in FIG. 2B. The repetitive folding along mountain and valley creases, coupled with the connection of the two ends, results in the formation of a complete Kresling origami structure, as shown in FIGS. 1A-1B.

Figure 3:
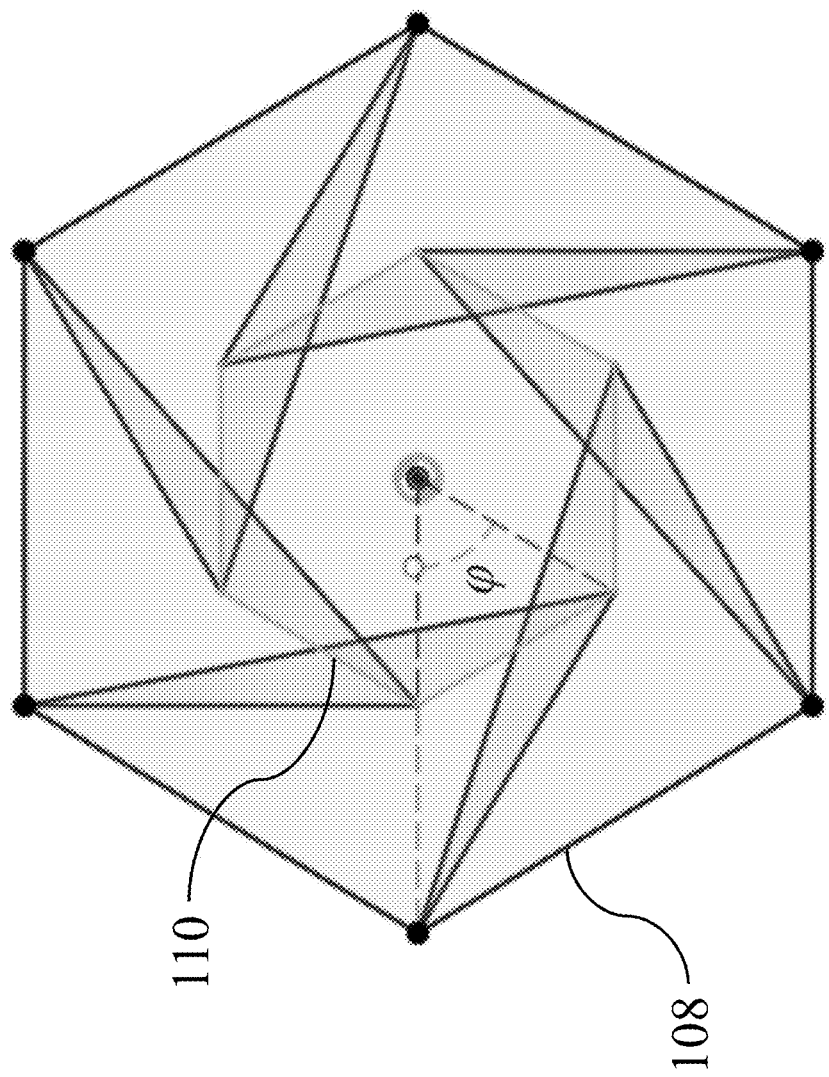
FIG. 3 depicts a schematic view of the conical Kresling pattern of the structure of FIG. 1A, showing the twist angle from a top view.

The top view of the folded conical Kresling structure, presented in FIG. 3, reveals that the vertices of the top and bottom surfaces are situated on two circumcircles (108, 110). The radii of these circumcircles (108, 110), denoted as r and R for the top and bottom circumcircles, respectively, can be calculated as follows:

$$r = \frac{a}{2\sin\left(\frac{\pi}{n}\right)}, R = \frac{b}{2\sin\left(\frac{\pi}{n}\right)}$$

("Equation 1") where n is the number of unit cells, and a is calculated based on the perimeter length of the top polygon, denoted as l:

$$a = \frac{l}{n}$$

("Equation 2"). The conical Kresling structure achieves folding through a twisting action. The twist angle, denoted as $\phi$, reflects the relative rotation angle between the bottom and top surfaces, as depicted in FIG. 3. Notably, the twist angle must adhere to the constraint $$0 \le \phi_1 \le \pi - \frac{2\pi}{n},$$

where $$\phi_{max} = \pi - \frac{2\pi}{n}$$

represents the condition in which the valley crease lines intersect each other. When $\phi = \phi_{max}$, the valley crease lines intersect at a single point, resulting in the generation of an enclosure volume, such as the bottom section in FIG. 1B. This feature serves as the foundation for designing the debris collector.

Throughout the folding process, the lengths of mountain and valley creases are influenced by the twist angle and can be expressed as follows:

$$\tilde{c}(h, \phi) = \sqrt{\{h^2 + r^2 + R^2 - 2rR\cos(\phi)\}}, \quad \text{("Equation 3A")}$$

$$\tilde{d}(h, \phi) = \sqrt{h^2 + r^2 + R^2 - 2rR\cos\left(\phi + \frac{2\pi}{n}\right)}, \quad \text{("Equation 3B")}$$

where $h(\phi)$ represents the height of the Kresling pattern at any given state.

B. Conical Kresling Patterned Volume Model

The shape of the conical Kresling pattern closely resembles that of a regular polygon frustum, as illustrated in FIG. 1A. The volume of such a frustum can be determined using the formula:

$$V = \frac{h}{3}\left(A_1^2 + \sqrt{A_1 A_2} + A_2^2\right)$$

("Equation 4"), where $A_1$ and $A_2$ represent the areas of the top and bottom planes, respectively, while h denotes the height of the structure. For the conical Kresling pattern in its deployed state ("State 1") (see, FIG. 1A), the volume expression can be derived from the area calculation of regular polygons, yielding:

$$V_1 = \frac{nh}{12}\cot\left(\frac{\pi}{n}\right)(a^2 + ab + b^2)$$

("Equation 5"). This volume expression, as described in Equation 5, is characterized by its highly nonlinear nature, as it depends on various pattern parameters. When utilizing the designed conical Kresling structure as a debris collector, the volume of the origami becomes a critical factor, ensuring it is sufficiently spacious to accommodate the target debris.

In its undeployed or folded state ("State 2") (see, FIG. 1B), only the enclosure volume is considered, resembling a right polygonal pyramid. The volume of the pyramid for the bottom part is expressed as:

$$V_2 = \frac{nh_b}{12}\cot\left(\frac{\pi}{n}\right)b^2$$

("Equation 6"), where $h_b$ represents the height of the pyramid and is calculated as $$h_b = \frac{h_2}{1+\frac{a}{b}}.$$

It is worth noting that the influence of twist in the Kresling pattern on its volume may be negligible. Specifically, for the volume calculation, $$\lambda = \sin\left(\frac{\pi}{n}\right),$$

and $\phi_1=0$, resulting in an absence of twist when the pattern is fully deployed.

C. Conical Kresling Patterned Energy Model

Incorporating the panel deformation that occurs during folding in a Kresling origami, the elastic energy, in the form of strain energy, plays an important role in the folding process. The strain energy required for folding can be expressed as:

$$U = \frac{n\kappa_m}{2}(c - \tilde{c}(h, \phi))^2 + \frac{n\kappa_v}{2}(d - \tilde{d}(h, \phi))^2$$

("Equation 7"), where $\kappa_m$ and $\kappa_v$ represent the stiffness coefficients associated with the mountain and valley creases, respectively. The strain energy is influenced by the difference between the actual crease lengths (c and d) and the lengths determined by the folding state $\tilde{c}(h, \phi)$ and $\tilde{d}(h, \phi)$, as dictated by the geometric parameters. To gain insights into the strain energy with respect to height for various b values, refer to the plots presented in FIG. 4.

Solving for the critical points by setting the derivatives of the strain energy in Equation 7 to zero reveals three solutions, signifying three stable cases. Among these, the mono-stable case involves the conical Kresling pattern remaining unfolded and stable under one specific state. The other two cases are bi-stable, encompassing one stable state and one quasi-stable state. The quasi-stable state demands a continuous input of energy to maintain stability, rendering it impractical for autonomous debris collection. Consequently, the bi-stable case, with two stable states, is selected as the basis for designing the debris collector's structure.

For the bi-stable case featuring two stable states, the values of $\phi$ and h for these states can be determined by solving $\partial U/\partial h=0$ and $\partial U/\partial \phi=0$. This yields the following expressions:

$$\phi_1 = \arcsin(\lambda) - \frac{\pi}{n}, \quad \text{("Equation 8A")}$$

$$\phi_2 = \pi - \arcsin(\lambda) - \frac{\pi}{n}, \quad \text{("Equation 8B")}$$

$$h_1 = \sqrt{c^2 - r^2 - R^2 + 2rR\cos(\phi_1)}, \quad \text{("Equation 8C")}$$

$$h_2 = \sqrt{c^2 - r^2 - R^2 + 2rR\cos(\phi_2)}, \quad \text{("Equation 8D")}$$

where $$\lambda = \sin\left(\phi + \frac{\pi}{n}\right) = \frac{b - 2c\cos(\beta)}{a}\sin\frac{\pi}{n}$$

is constrained by $$\sin\left(\frac{\pi}{n}\right) \le \lambda < 1$$

due to geometric constraints $$0 \le \phi \le g - \frac{2\pi}{n}.$$

Achieving radial closability for the fully folded state, exemplified in FIG. 1B, necessitates $\phi_2=\phi_{max}$, where $\phi_{max}$ represents the maximum twist angle for the fully folded state where crease lines intersect at one point. When $\phi_2=\phi_{max}$, it follows that $$\lambda = \sin\left(\frac{\pi}{n}\right),$$

leading to the geometric constraint:

$$b - 2c\cos(\beta) = a$$

("Equation 9"). This constraint ensures radial closability. By substituting $$\lambda = \sin\left(\frac{\pi}{n}\right)$$

into the expression for $\phi_1$ in Equation 8A, it is further established that $\phi_1=0$, as depicted in the example presented in FIG. 1A. Therefore, the bi-stable case, encompassing two stable states of the conical Kresling origami, is chosen to fulfill the capturing and sealing functions of the debris collector. The deployed state (see, FIG. 1A) is utilized for capturing debris when unfolded, while the undeployed state (see, FIG. 1B) is employed for enclosing the collected debris within the collector when fully folded.

Figure 4:
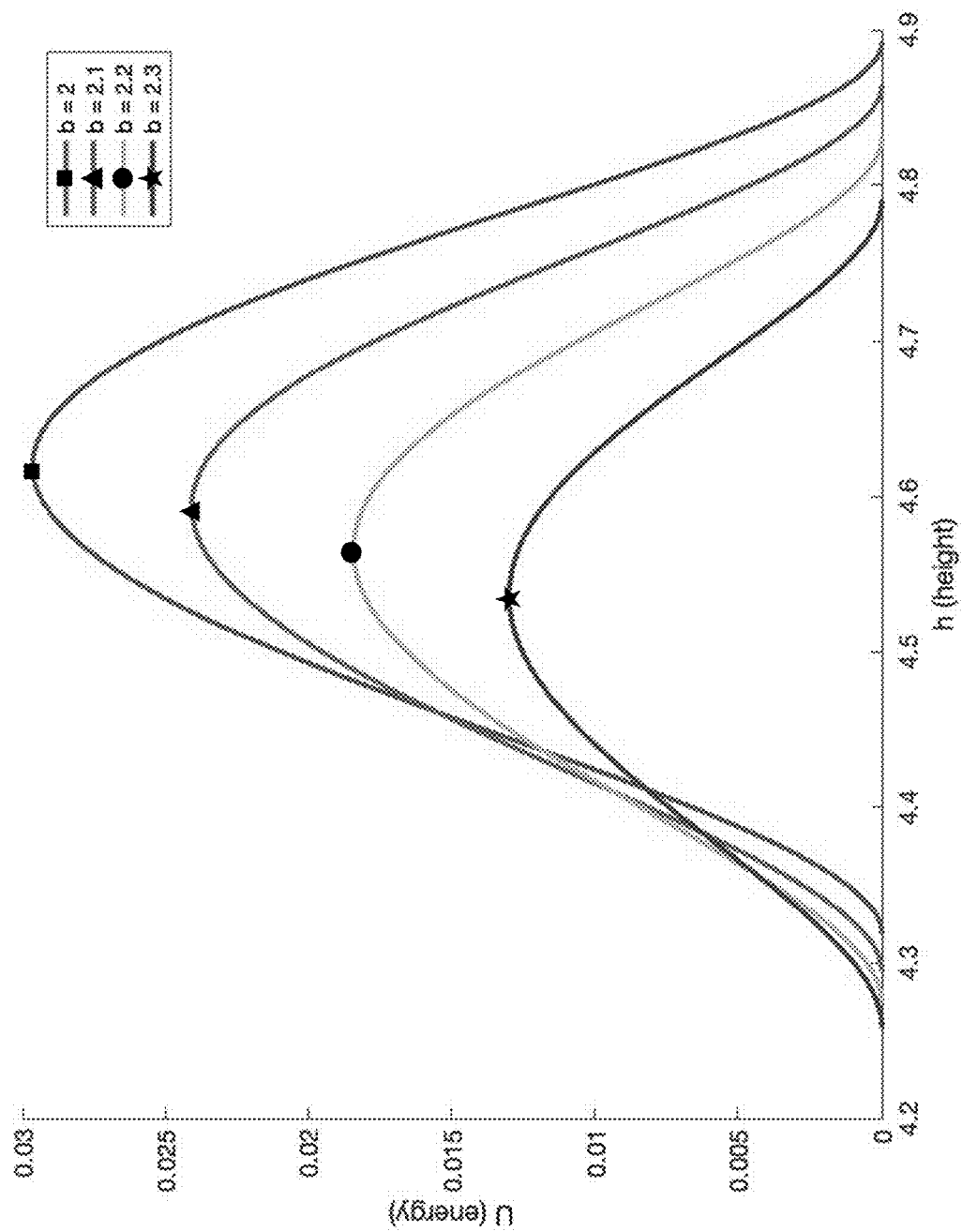
FIG. 4 depicts a graphical plot showing the strain energy as a function of height during the folding process for the structure of FIG. 1A.

During the folding process between the two stable states, the strain energy, as depicted in FIG. 4, follows a parabolic curve. To determine the total energy consumption during this transition, the integral of the strain energy in Equation 7 from one stable state (characterized by the initial twist angle $\phi_1$) to the other stable state (characterized by the final twist angle $\phi_2$ is calculated. To simplify the analysis, linear interpolation of h in terms of $\phi$ is applied between the two stable states, resulting in $\bar{h}(\phi) \approx h$. The total energy consumed during the folding process can then be expressed as:

$$\sum U = \left[ \int_{\phi_1}^{\phi_2} 2\frac{\kappa_v n}{2} \right] \left( \sqrt{\bar{h}(\phi)^2 + r^2 + R^2 - 2rR\cos(\phi)} - c \right)^2 +$$

$$\frac{\kappa_m n}{2} \left( \sqrt{\bar{h}(\phi)^2 + r^2 + R^2 - 2rR\cos\left(\phi + \frac{2\pi}{n}\right)} - d \right)^2 \right] d\phi.$$

Given the paramount concern over energy consumption in space-related operations, the strain energy required for folding and unfolding the conical Kresling-based debris collector between the two stable states will be utilized as a performance metric during the structural design phase. In this optimization framework, the geometric and volume models serve as constraints, ensuring that the Kresling origami is both physically and functionally feasible while optimizing the objective function defined by the energy model.

C. Exemplary Design Optimization Techniques

Having introduced the geometric, volume, and energy models in the preceding sections, the description of the optimal design problems can be considered. Two selected distinct models have been developed and described herein to showcase the versatility of the Conical Kresling structured space debris collector design process. The first model ("Model 1") is geared towards the collection of minute particle debris dispersed in a cloud, which will subsequently be compressed into a compact space. In contrast, the second model ("Model 2") is aimed at capturing a single, large-sized object with a given estimated volume that requires a larger storage volume for the collected space debris.

For Model 1, which focuses on the capture of a diffuse cloud of minuscule particle debris, the design objective is to minimize the energy required for actuating debris collector folding and unfolding process while letting the unfolded volume, denoted as $V_1$ in Equation 5, match the estimated volume of the diffused debris cloud, denoted by $V_{min,1}$. To achieve this objective, the design problem is formulated as a parameter optimization problem subject to a set of constraints, expressed as:

$$\min_{b,c,n,\beta} \sum U, \quad \text{("Equation 10A")}$$

$$\text{s.t. } a = \frac{l}{n}, r = \frac{a}{2\sin\left(\frac{\pi}{n}\right)}, R = \frac{b}{2\sin\left(\frac{\pi}{n}\right)}, \quad \text{("Equation 10B")}$$

$$d = \sqrt{b^2 + c^2 - 2bc(\cos(\beta))}, \quad \text{("Equation 10C")}$$

$$\phi_1 = \arcsin(\lambda) - \frac{\pi}{n}, \quad \text{("Equation 10D")}$$

$$\phi_2 = \pi - \arcsin(\lambda) - \frac{\pi}{n}, \quad \text{("Equation 10E")}$$

$$h_1 = \sqrt{c^2 - r^2 - R^2 + 2rR\cos(\phi_1)}, \quad \text{("Equation 10F")}$$

$$h_2 = \sqrt{c^2 - r^2 - R^2 + 2rR\cos(\phi_2)}, \quad \text{("Equation 10G")}$$

$$\lambda = \frac{b - 2c\cos(\beta)}{a}\sin\left(\frac{\pi}{n}\right), \quad \text{("Equation 10H")}$$

$$0 \leq \phi_1 \leq \pi - \frac{2\pi}{n}, h_1 \geq 0, \quad \text{("Equation 10I")}$$

$$0 \leq \phi_2 \leq \pi - \frac{2\pi}{n}, h_2 \geq 0, \quad \text{("Equation 10J")}$$

$$b - 2c\cos(\beta) = a, \quad \text{("Equation 10K")}$$

$$V_1 \geq V_{min,1}, \quad \text{("Equation 10L")}$$

where the objective is to minimize the total strain energy during the folding process. The constraint set includes the geometric constraints (Equation 10B)-(Equation 10C) to ensure the designed Kresling origami remains physically feasible, the two stable states for starting and ending the folding process (Equation 10D)-(Equation 10H), the associated stable state constraints (Equation 10I)-(Equation 10J), the radial closability constraint (Equation 10K) to facilitate proper folding, and the minimum volume constraint (Equation 10L) to ensure the collector can capture the target debris cloud. Given that parameter a can be considered a normalized value by setting the perimeter length of the top polygon/ as a unit value, it is treated as a given parameter.

For Model 2, designed to capture a single large-sized object with an estimated volume $V_{min,2}$, the goal is to let the volume of the closure space, denoted as $V_2$ in (Equation 6) match the object volume. This model also formulates a parameter optimization problem with similar constraints as Model 1, including geometric constraints, stable state constraints, associated stable state constraints, radial closability constraints, Equations 10B through 10K, and the minimum folded volume constraint (Equation 11C). The design optimization problem can be formulated as:

$$\min_{b,c,n,\beta} \sum U, \quad \text{("Equation 11A")}$$

$$\text{s.t. (Equation } 10B) - (\text{Equation } 10K) \quad \text{("Equation 11B")}$$

$$V_2 \geq V_{min,2}. \quad \text{("Equation 11C")}$$

Both Model 1 and Model 2 optimization problems involve continuous variables (i.e., b, c, and β) and an integer variable (n). The constraints in these models are nonlinear in nature. Therefore, these problems fall under the category of mixed integer nonlinear programming (MINLP) problems, which are known to be NP-hard. To tackle these challenging optimization problems, a commercial MINLP solver is employed, which combines sequential quadratic programming and the branch-and-bound method to find optimal solutions.

III. Exemplary Autonomous Actuation Systems and Methods

Figure 5:
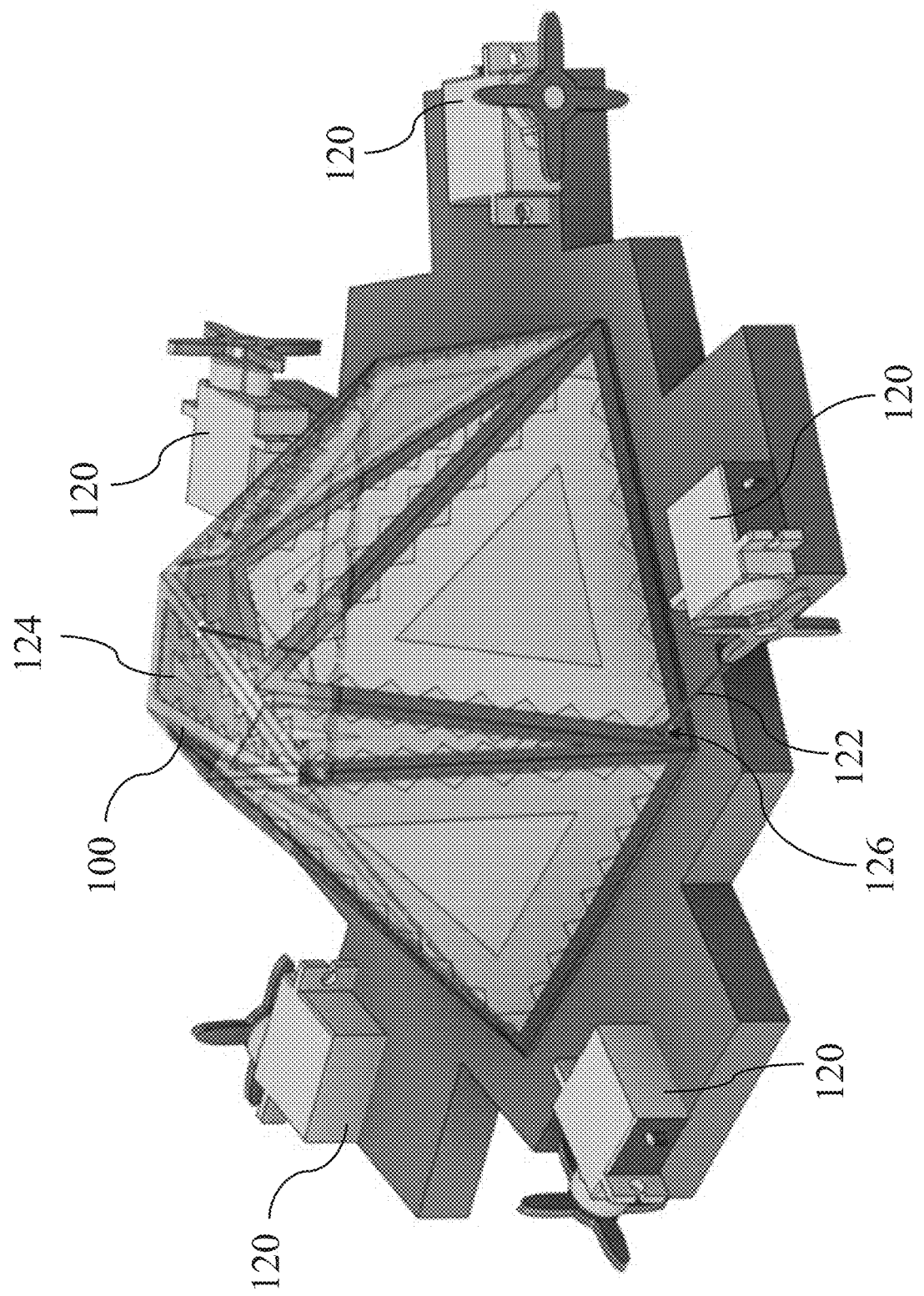
FIG. 5 depicts a schematic view of one example of an autonomous actuation system operable to selectively deploy the structure of FIG. 1A.

As shown in FIG. 5, the actuation system leverages one or more tethered rotational servo motors (120) to facilitate the folding and unfolding processes. Each panel is linked to at least one pull cable or string (122) (only one such string is illustrated in FIG. 5), with one end affixed to the respective panel (124) and the other connected to a continuous rotational servo motor (120) to drive the folding process. These servo motors (120) operate by retracting the attached strings (e.g., string (122)), thereby influencing the movement of the associated panels (e.g., panel (124)). By applying tension and initiating servo rotation, the strings are pulled, causing the paired opposing panels to converge efficiently, resulting in the entire structure folding seamlessly into a closed configuration. The number of servo motors (120) employed may be equal the count of unit cells, and the strings are reeled in along a linear path. This approach ensures that each unit cell has an associated servo motor (120), enabling the uniform application of radial force across the origami structure for consistent and even folding. This tethering strategy significantly simplifies the actuation system's design complexity while maintaining uniform torque distribution across all motors (120).

During the folding process, strings (e.g., string (122)) may intercept panels (e.g., panel (124)) to which they are not directly connected, resulting in bending of the string and increased friction. To mitigate this issue, slits (126) (only one such slit is illustrated in FIG. 5) are strategically incorporated into the panels using the string and slits placement optimization method, as detailed below. These slits (126) allow the strings to pass through the intercepting panels without bending during folding, as illustrated in FIG. 5. The objective is to minimize the interaction of strings with unconnected panels by reducing both the number and length of slits across all panels. This reduction in friction between the strings and irrelevant panels, achieved through the string and slit placement optimization method, ultimately translates to a decrease in the actuation energy required for the folding process. The number and positioning of these slits (126) are determined by the placement of the two ends of the strings on all paired panels. Therefore, the decision variables are defined as $\gamma=[\gamma_1\ \gamma_2\ \gamma_3]^T \in \mathcal{R}^3$ and $\delta=[\delta_1\ \delta_2\ \delta_3]^T \in \mathcal{R}^3$, where $\gamma$ and $\delta$ are used to represent the barycentric coordinates of the string ends on the paired top and bottom panels, respectively. Since the designed origami structure is symmetric, each string has the same top and bottom endpoints on all paired panels.

To determine the number and positions of these slits (126) on the panels, the trajectories of the folding process were discretized for the conical Kresling structure. This approach enables precise calculations of the panel positions and orientations during the folding process and consequently leads to the high precision of the placement of the required slits. From the above settings, n is the number of panels and m is the number of discretized steps.

Figure 6:
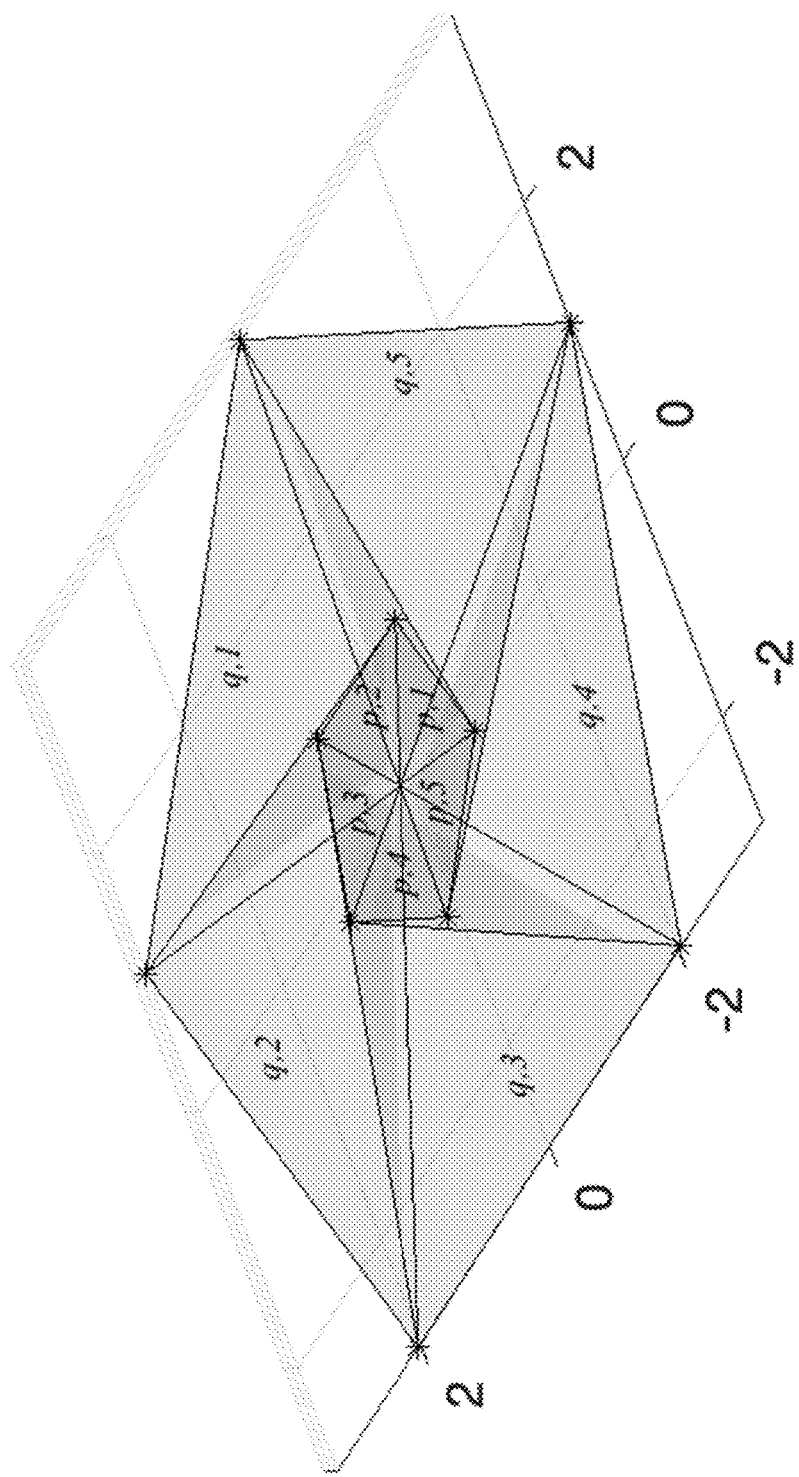
FIG. 6 depicts a plotted illustration of top and bottom panel sets of the structure of FIG. 1A.

Since panel deformation and orientation changes occur on a conical Kresling pattern, the position of the string ends will be represented by the relative position of panel edge points. Therefore, the barycentric coordinate is used to represent the relative position. For example, if the coordinates of edge points of the 3D triangular plane are $x_1 \in \mathcal{R}^3$, $x_2 \in \mathcal{R}^3$, and $x_3 \in \mathcal{R}^3$ then the coordinate of a point on the plane can be defined by $\gamma_1 x_1 + \gamma_2 x_2 + \gamma_3 x_3$, where $\gamma_1+\gamma_2+\gamma_3=1$ and $0 \leq \gamma_\iota \leq$, $\iota=1,2$. The vector $\gamma$ represents the barycentric coordinates of the string end on the top panel, denoted by panel p, and $\delta$ represents the barycentric coordinates of the string end on the bottom panel, denoted by panel q. For the two sets of panels on the top and bottom, denoted by p and q respectively, there are n panels for each set, represented by (p, j) for any panel on the top and (q, j) for any panel on the bottom, where j=1, . . . , n, as shown in FIG. 6. The positions of the slits (126) are mathematically calculated to minimize the interaction of strings with unconnected panels by reducing both the number and length of slits across all panels.

IV. Example Manufacturing Techniques

Figure 7:
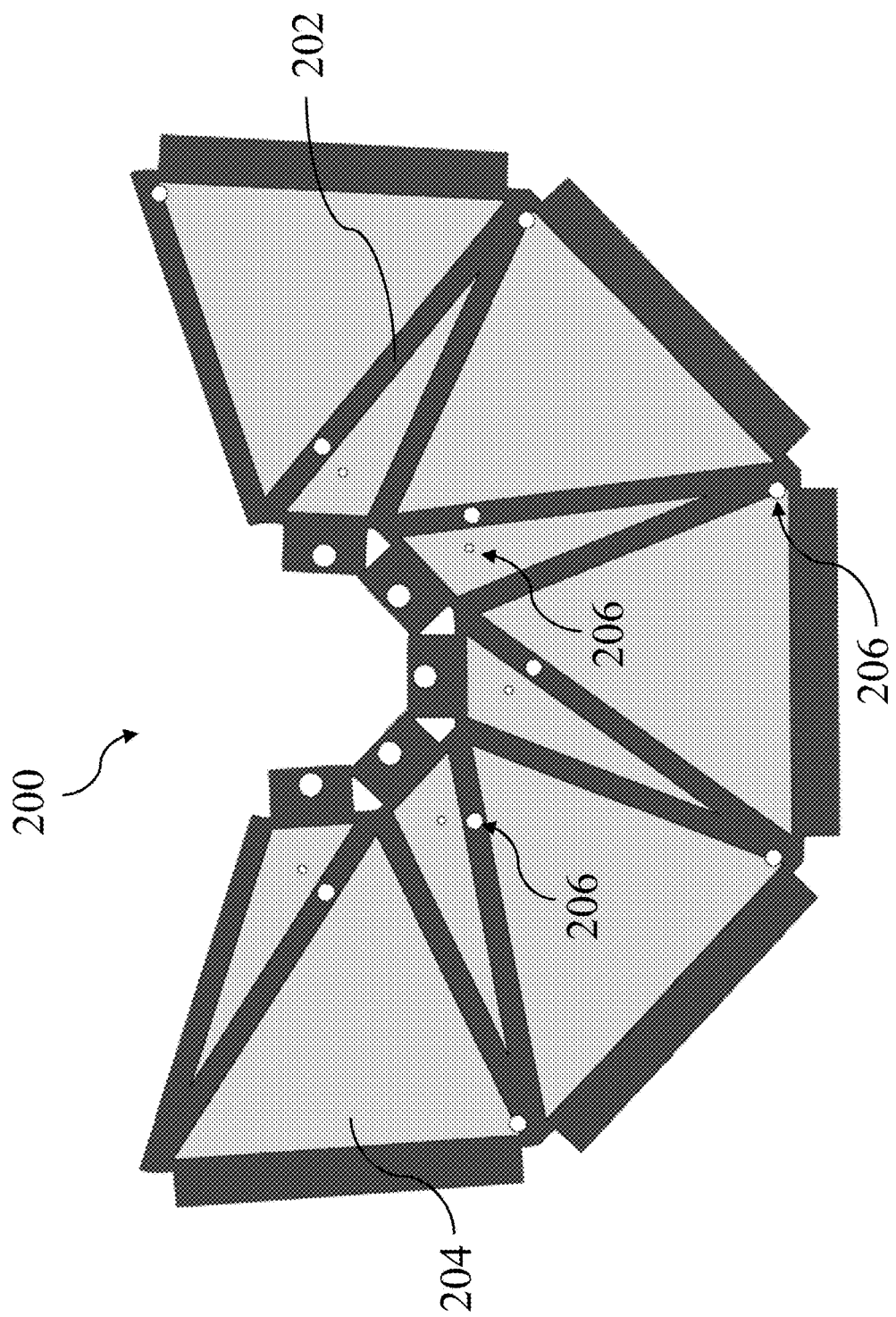
FIG. 7 depicts a schematic view of a Computer Aided Design (CAD) representation of another example of a conical Kresling structure, the lighter shaded areas representing PLA materials and the darker shaded areas representing TPU materials.

To manufacture the Conical Kresling structure, a dual extrusion 3D printer can be employed, enabling the simultaneous printing of two materials to achieve the desired flexibility for hinges and rigidity for panels. However, it should be understood that various comparable alternative methods and systems may instead be utilized to form the materials as they are described herein. Two distinct materials were utilized for this purpose: flexible Thermoplastic Polyurethane (TPU) plastic for the hinges and rigid Polylactic Acid (PLA) plastic for the panels, specifically Tough PLA filament, known for its enhanced strength. A dual-extrusion 3D printer can simplify the assembly process, as it allows both materials to be printed together in a single high-precision print. The CAD assembly (200) of the Conical Kresling structure, complete with hinges (202) and panels (204), is illustrated in FIG. 7, demonstrating the integration of PLA (lighter shaded areas) and TPU (darker shaded areas) components. The holes or slits (206) for installing the strings are also shown in FIG. 7.

Figure 8:
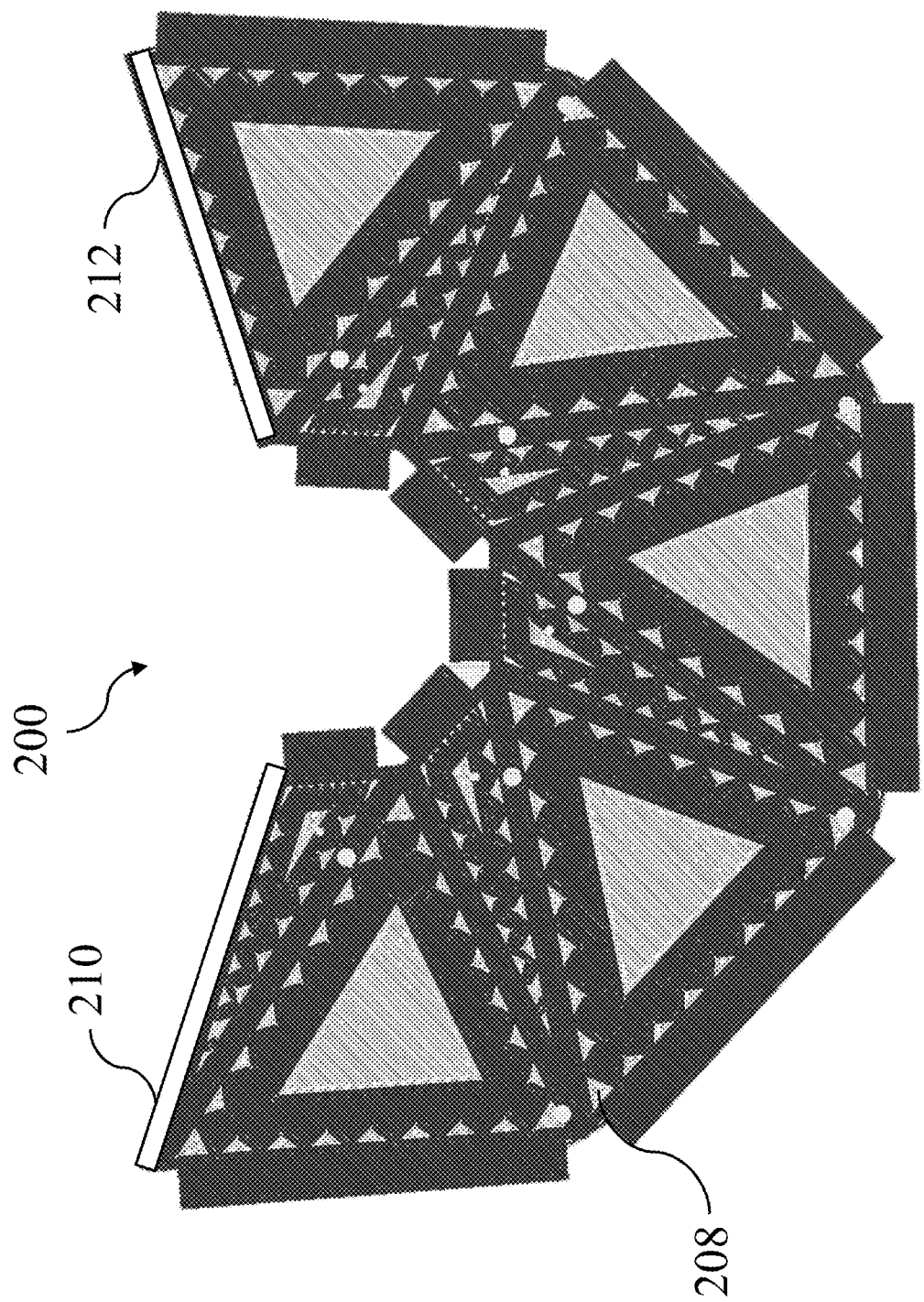
FIG. 8 depicts a schematic view of a cross-sectional slice of the structure of FIG. 10, showing a joinery technique employed at the intersections of the PLA and TPU materials.

However, given that TPU and PLA have different temperature requirements for synthesis, they naturally do not fuse together efficiently during the printing process. To address this challenge, an innovative joinery technique (208) similar to a dovetail joint was employed at the intersections of these materials, as depicted in FIG. 8. This method effectively sandwiched a TPU layer evenly between the PLA faces, ensuring symmetrical bidirectional folding. This approach not only facilitates rapid prototyping and testing but also opens up the possibility of on-orbit manufacturing for the designed debris collector, leveraging the advantages of 3D printing technology in space applications.

Once the planar interconnected panels are formed as shown in FIG. 8, such as by three-dimensional printing or otherwise, opposing tabs (210, 212) are affixed together to form the initial state of the structure (200) and to prepare it for insertion of the strings as described. In one embodiment, the tabs (210, 212) are joined together using glue, while it should be understood that various alternative known methods may instead be used to affix the tabs (210, 212) together.

V. Selected Experimental Results

In this section, certain simulation results are presented for designing a specific debris collector, focusing on achieving a minimum volume for $V_1$ and $V_2$, respectively, at the corresponding stable state. Several design considerations were taken into account to effectively utilize the conical Kresling pattern in creating a foldable debris collector.

To ensure ease of folding and reduce structural complexity, lower and upper bounds are imposed on the number of unit cells, such that $5 \leq n \leq 12$. Additionally, upper and lower bounds are set on the structure's height at stable State 2, ranging from 0.01 to 0.1 mm, ensuring that the designed structure can be fully folded flat. Furthermore, parameter a is normalized by fixing the perimeter length of the top polygon at l=6 mm.

Figure 9:
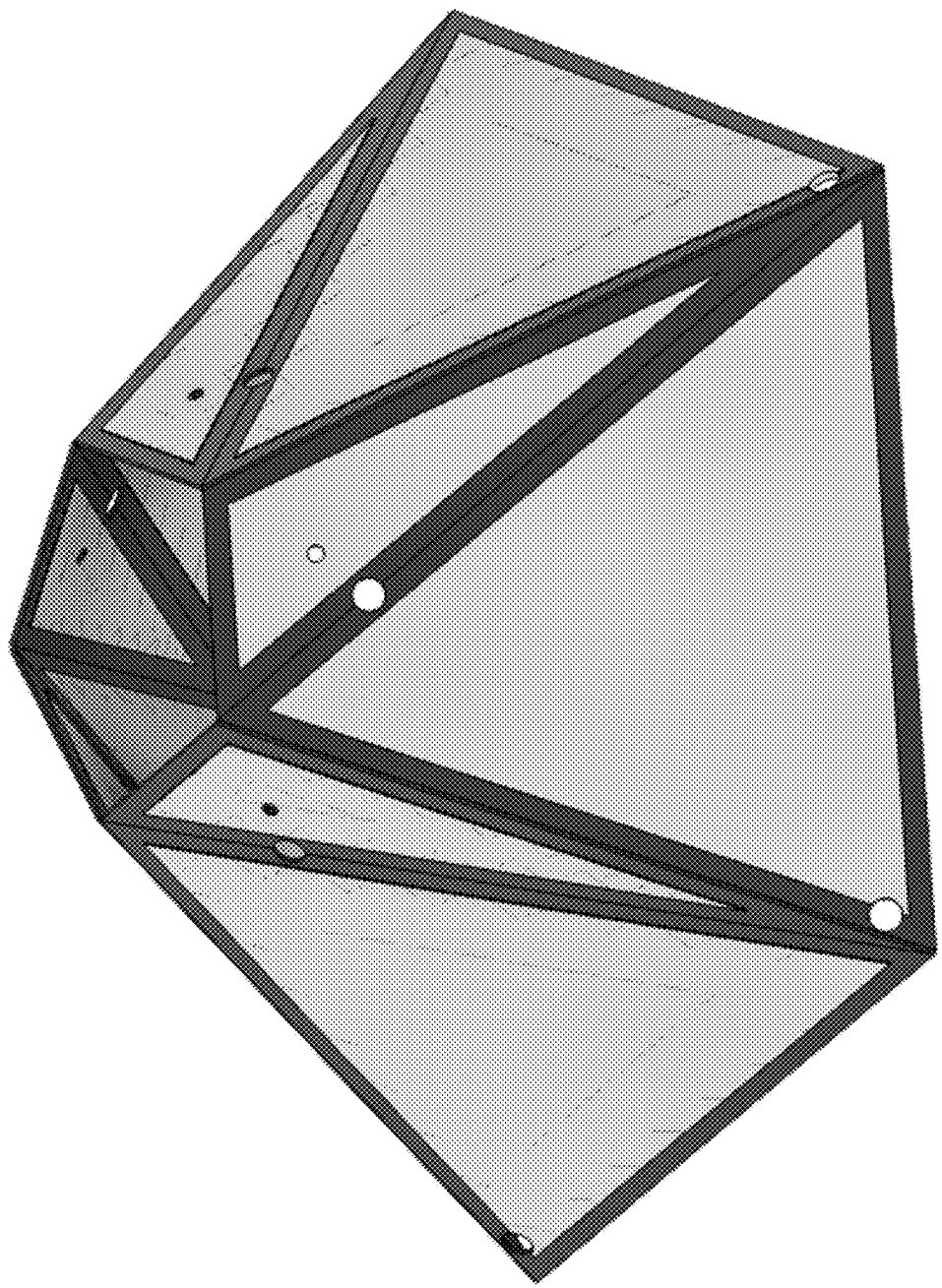
FIG. 9 depicts a schematic view of a CAD representation of another example debris collection structure.

The two distinct optimal design problems, as defined in Equations 10A-K and 11A-B, may be solved using a MINLP solving algorithm. Given the highly nonlinear nature of the problem, the solutions obtained from the MINLP solver represent local optima without guaranteeing global optimality. To explore the possibility of finding a global optimal solution for the formulated MINLP problems, a heuristic approach is employed in conjunction with the MINLP solver. The heuristic approach involves solving a series of cases with various random initial guesses to identify the best local optimal solution for prototyping. Specifically, for both problems, we generate 500 different sets of initial guesses for all design variables, with the following ranges: $b \in [1,5]$ mm, $c \in [1,5]$ mm, $n \in [5,12]$, and $$\beta \in \left[\frac{\pi}{4}, \pi\right]$$

rad. This model can be seen in FIG. 9.

For Equation 10 with a lower bounded $V_1 \geq V_{min} = 40$ mm$^3$, out of the 500 cases, 498 cases successfully converge, with 383 of them reaching the same optimum. This optimal solution minimizes the energy while satisfying all constraints. Consequently, the final design variable values are selected from this optimal point, resulting in b=4.072 mm, c=3.904 mm, n=5, and β=1.194 rad for the first model.

Figure 10:
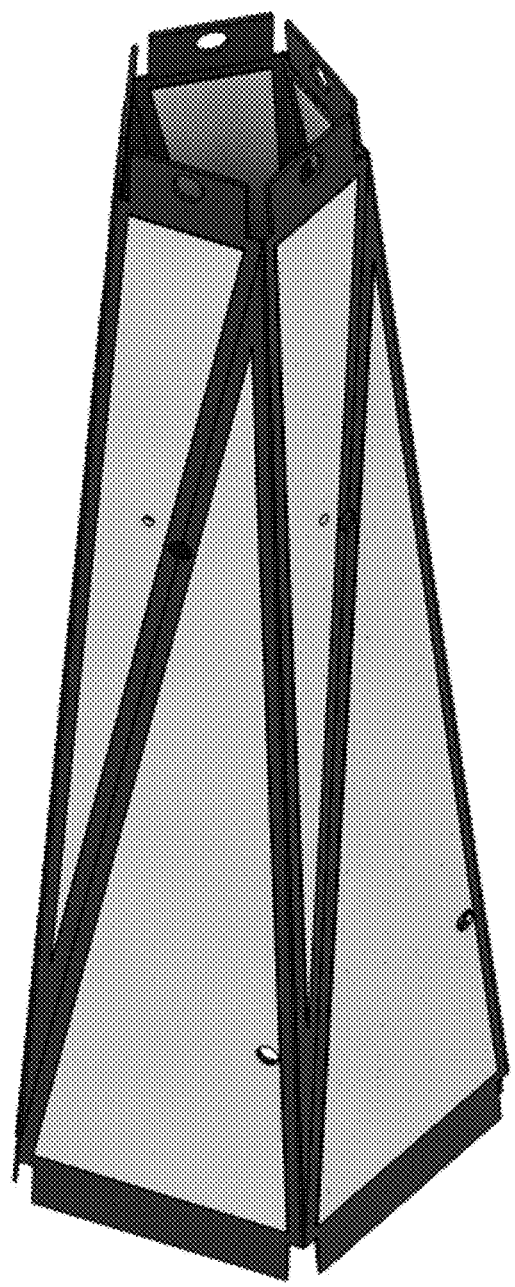
FIG. 10 depicts a schematic view of a CAD representation of another example debris collection structure.
Figure 11A:
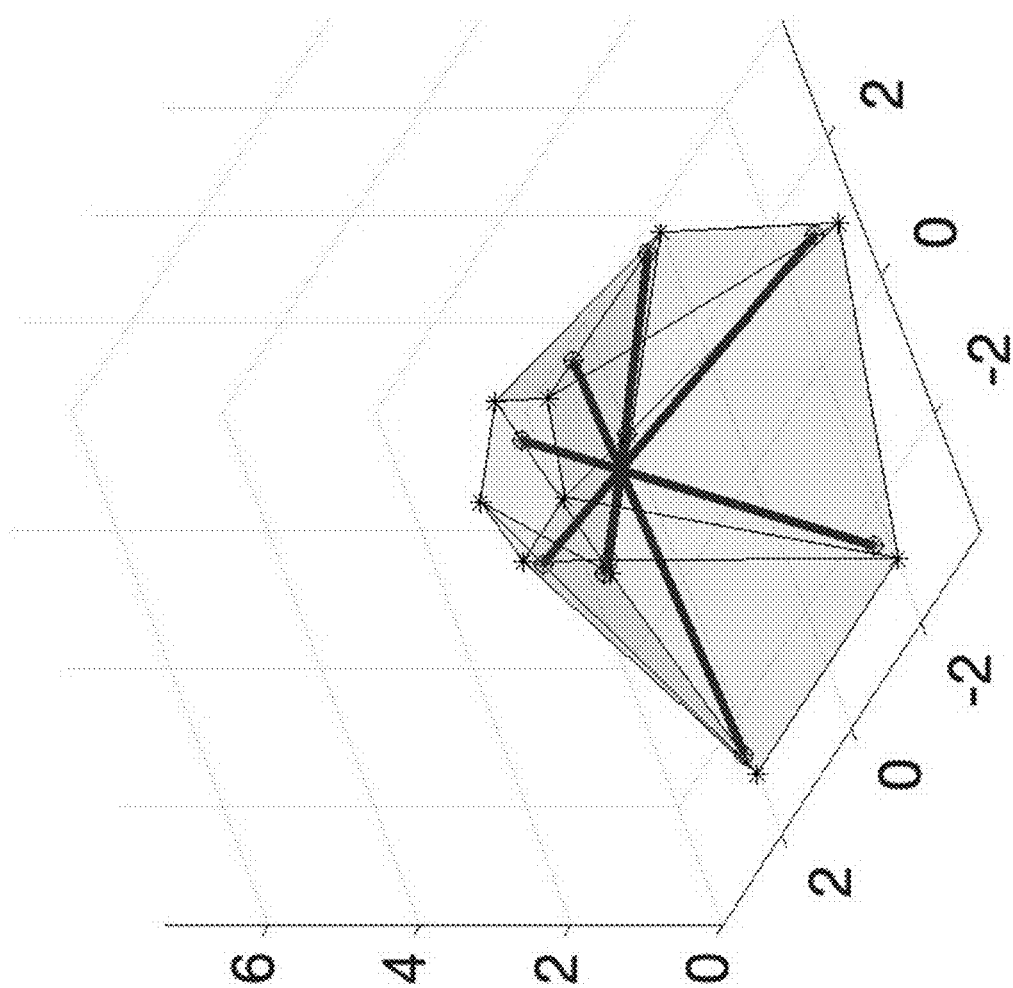
FIG. 11A depicts a plotted illustration of panel hole placements of the structure of FIG. 12, shown in a deployed (i.e., unfolded) state.
Figure 11B:
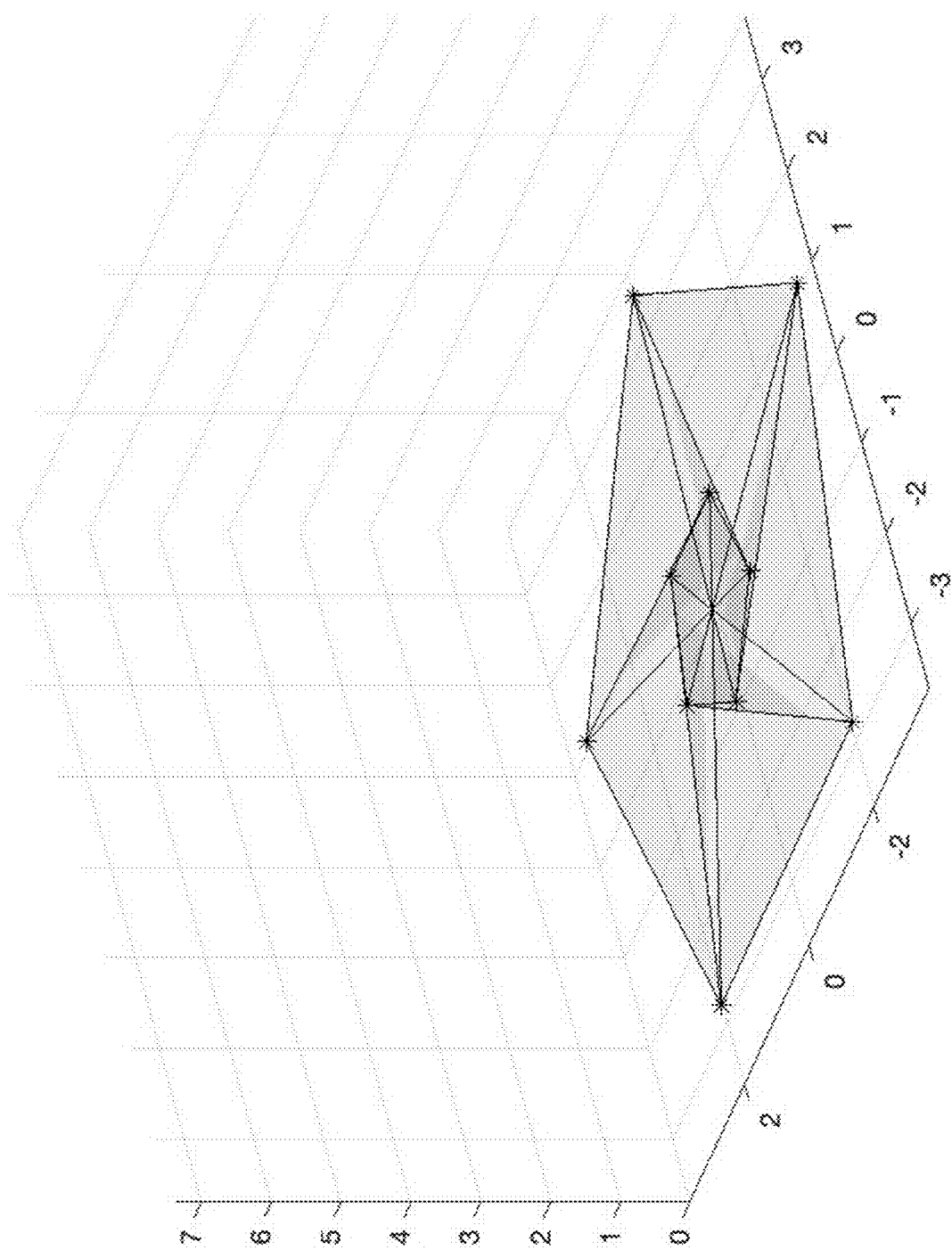
FIG. 11B depicts a plotted illustration of panel hole placements of the structure of FIG. 12, shown in an undeployed (i.e., folded) state.
Figure 12A:
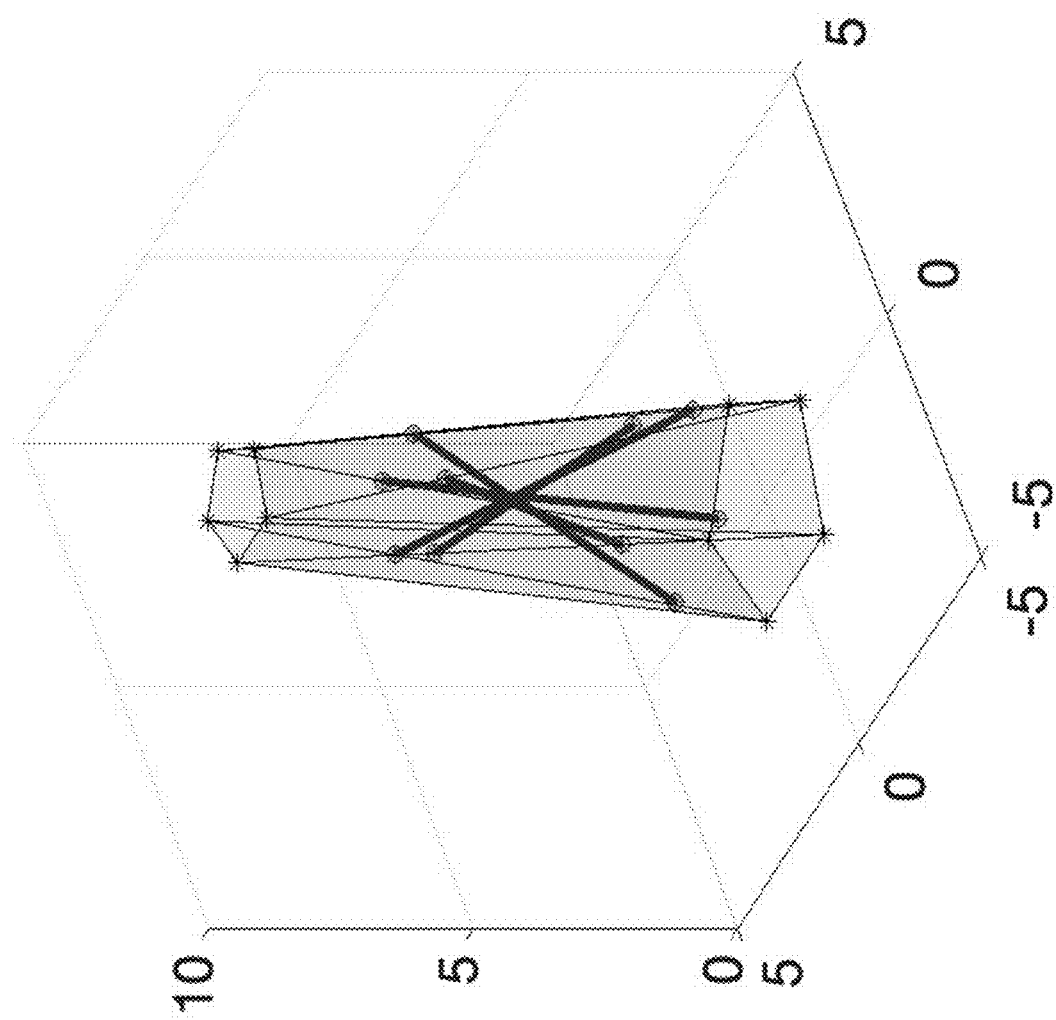
FIG. 12A depicts a plotted illustration of panel hole placements of the structure of FIG. 13, shown in a deployed (i.e., unfolded) state.
Figure 12B:
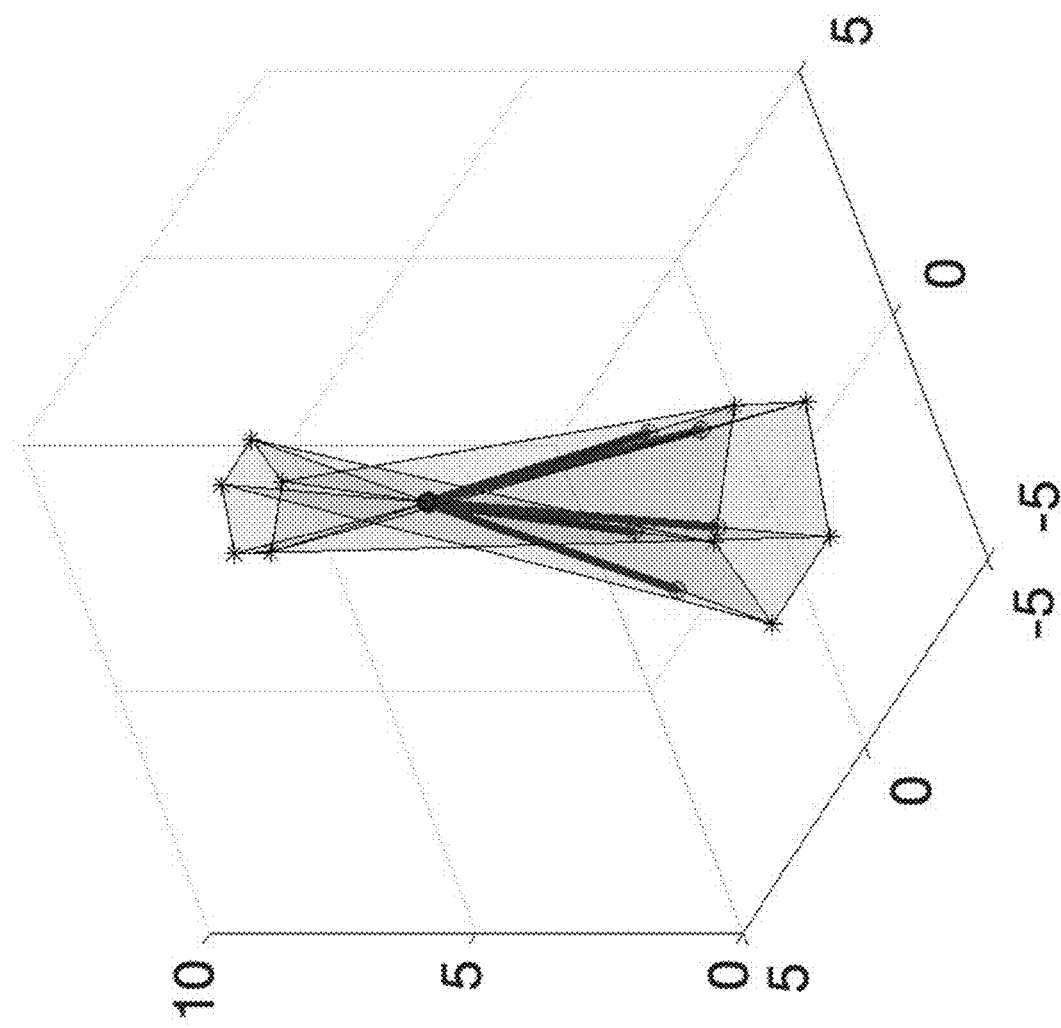
FIG. 12B depicts a plotted illustration of panel hole placements of the structure of FIG. 13, shown in an undeployed (i.e., folded) state.
Figure 13:
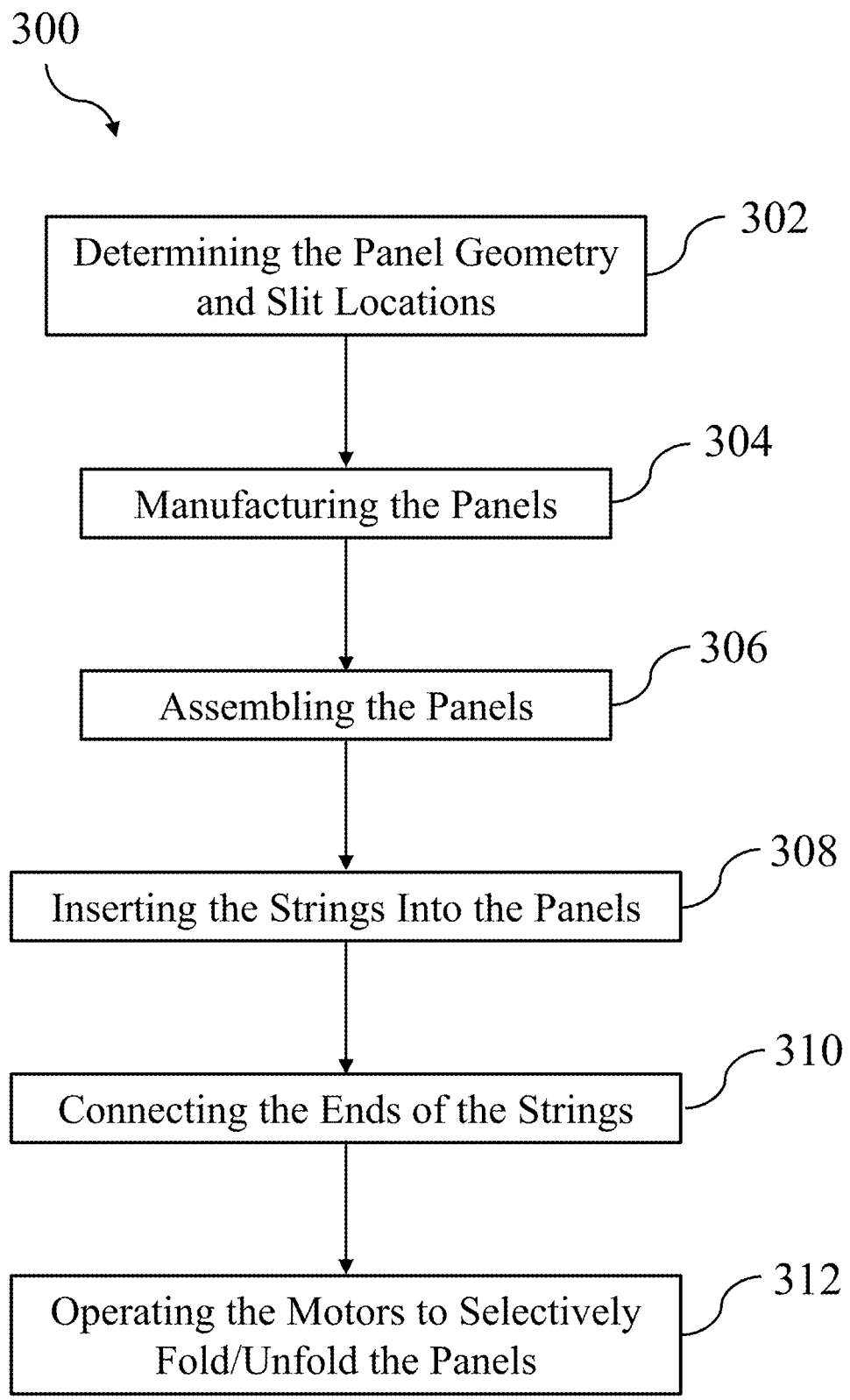
FIG. 13 depicts a flowchart representation of one exemplary method of manufacturing and operating a space debris collection system.

For Equation 11 with a lower bounded $V_2 \geq V_{min} = 20$, the solver is initiated for 500 cases, with 273 cases converging to the same optimum. The 500 different sets of initial guesses for design variables are generated randomly within the ranges of $b \in [1,5]$ mm, $c \in [1,15]$ mm, $n \in [5,12]$, and $$\beta \in \left[\frac{\pi}{4}, \pi\right]$$

rad. The optimal solution for the second model yields b=2.330 mm, c=10.046 mm, n=5, and β=1.515 rad. This model can be seen in FIG. 10.

The simulation of the actuation process was conducted with a total of m=100 discrete steps, utilizing the parameters defined for both Model 1 and Model 2 described above. The choice of the number of discrete steps is a trade-off between computational time and model accuracy. While a higher number of discrete steps provides increased accuracy, it can also lead to impractical precision, as the differences between consecutive steps become negligible.

By determining the string and slits placement optimization, the obtained results minimized the overall length of slits on the panels. The actuation design results for Model 1 in FIG. 9 yield $\gamma = [2.706 \times 10^{-3} \; 5.400 \; 0.9997]$ and $\sigma = [3.795 \times 10^{-2} \; 0.90719 \; 8.902 \times 10^{-2}]$. Similarly, for Model 2 in FIG. 10, the actuation design results yield $\gamma = [4.580 \times 10^{-6} \; 1.280 \times 10^{-2} \; 0.9872]$ and $\sigma = [1.287 \times 10^{-3} \; 0.7185 \; 0.2802]$.

As shown in FIGS. 11A-B and FIGS. 12A-B, the thicker linear lines represent the placement of the strings from the actuation system design results. These results illustrate a few instances of string intersections with the panels occurring in the region where holes are placed. The panels only exhibit collisions in the vicinity of the hole placements, indicating that the proposed hole placement strategy has successfully facilitated an efficient folding process for both simulations.

Accordingly, as described herein, a method (300) of manufacturing and deploying the space debris collection system can include, at step (302), determining the panel size and hole locations. Next, at step (304), printing the panels and hinges along with the slits or holes defined through each panel. Next, at step (306), assembling the panels into an initial operating position by affixing the opposing planar edges together (e.g., coupling tabs (210, 212) together) (see, FIG. 8). Next, at step (308), inserting the strings through the slits and, at step (310), attaching first ends of the strings to each respective panel and the opposing ends of the strings to one or more servo motors. Finally, at step (312), a remote user or an automation system may selectively activate the one or more servo motors to therefore translate the panels from an unfolded state to a folded state.

VI. Discussion

This disclosure describes an integrated approach for designing, actuating, and manufacturing a space debris collector based on the conical Kresling origami pattern. The design finds an optimized Kresling structure by minimizing the actuation energy requirement and meeting the minimum volume constraint for capturing a specific debris object with a given volume. In addition, the designed structure meets the geometric constraints to form an enclosure volume when fully folded to lock captured debris. The actuation system is also optimized using the hole placement method, allowing the strings to pull the panels efficiently.

The prototype is 3D printed using a combination of Thermoplastic Polyurethane (TPU) and Polylactic acid (PLA) materials to emulate the flexibility of origami while maintaining rigid panels. However, it should be understood that alternative materials may be utilized without disembarking from the key design aspects of the system (100) as described. Specific configurations are set on a CAD model, allowing easy fixes on dimensions, such as hole placements, and complex integration techniques to combine two types of material. The folding process is actuated using a plurality of tethered servo motors, or alternatively using one single servo motor or similar actuator configured to pull a single string to operate the plurality of folding motions described, to allow precise and efficient control throughout the folding process. Accordingly, the system (100), along with the actuation system, demonstrates advantages in being easily manufacturable, flexible, compressible or expandable across an extensive volume range, and adaptable to absorb impacts. The proposed space debris collection system can be attached to the spacecraft for deployment upon request. The system can also be configured to actively chase space debris when equipped with a suitable propulsion system (not shown).

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments, such as those where directions are referenced to the portions of the device, for example, toward or away from a particular element, or in relations to the structure generally (for example, inwardly or outwardly).

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

We claim:

1. A material collection system operable in low gravity or zero gravity environments, comprising:
   (a) a planar structure including a plurality of interconnected geometric panels, wherein each interconnection between two geometric panels defines a foldable coupling, wherein the planar structure defines a plurality of holes therethrough;
   (b) at least one actuator; and
   (c) a plurality of pull cables, wherein each pull cable of the plurality of pull cables passes through at least one hole of the plurality of holes, wherein a first end of each pull cable is coupled with at least one geometric panel and a second end of each pull cable is coupled with the at least one actuator;
   wherein the planar structure is operable between a first stable geometric state and a second stable geometric state, wherein an actuation of the at least one actuator to pull each of the plurality of pull cables is operable to transition the planar structure between the first stable geometric state and the second stable geometric state.

2. The material collection system of claim 1, wherein each geometric panel is formed of a first material and each foldable coupling is formed of a second material.

3. The material collection system of claim 2, wherein the first material includes polylactic acid (PLA) and the second material includes thermoplastic polyurethane (TPU).

4. The material collection system of claim 2, wherein the first material and the second material are joined together using one or more dovetail joints.

5. The material collection system of claim 1, wherein the planar structure forms a conical Kresling pattern.

6. The material collection system of claim 1, wherein the at least one actuator includes a plurality of servo motors.

7. The material collection system of claim 6, wherein an amount of the plurality of servo motors equals an amount of the plurality of pull cables.

8. The material collection system of claim 1, wherein each of the plurality of pull cables applies an equal amount of torque during the transition between the first stable geometric state and the second stable geometric state.

9. The material collection system of claim 1, wherein each of the plurality of pull cables is configured to pull in a linear path during the transition between the first stable geometric state and the second stable geometric state.

10. A material collection system, comprising:
    (a) a planar structure including a plurality of interconnected geometric panels shaped to fold into a conical Kresling pattern, wherein each interconnection between two geometric panels defines a foldable coupling, wherein the planar structure defines a plurality of holes therethrough;
    (b) a plurality of pull cables, wherein each pull cable of the plurality of pull cables passes through at least one hole of the plurality of holes, wherein a first end of each pull cable is coupled with at least one geometric panel;
    wherein the planar structure is operable between a first stable geometric state of the conical Kresling pattern and a second stable geometric state of the conical Kresling pattern, wherein an actuation to pull each of the plurality of pull cables is configured to transition the planar structure between the first stable geometric state of the conical Kresling pattern and the second stable geometric state of the conical Kresling pattern.

11. The material collection system of claim 10, wherein each geometric panel is formed of a first material and each foldable coupling is formed of a second material.

12. The material collection system of claim 11, wherein the first material includes polylactic acid (PLA) and the second material includes thermoplastic polyurethane (TPU).

13. The material collection system of claim 11, wherein the first material and the second material are joined together using one or more dovetail joints.

14. The material collection system of claim 1, wherein each of the plurality of pull cables is configured to pull in a linear path during the transition between the first stable geometric state and the second stable geometric state.

15. A method of configuring a debris collection system, wherein the debris collection system includes a planar structure having a plurality of interconnected geometric panels, at least one actuator, and a plurality of pull cables, the method comprising:
    (a) forming the planar structure having opposing ends, each interconnection between two geometric panels defining a foldable coupling, and the plurality of interconnected geometric panels having a plurality of holes formed therethrough;
    (b) coupling together the opposing ends of the planar structure;
    (c) inserting a respective one of the plurality of pull cables through each of the plurality of holes formed through the planar structure; and
    (d) attaching a first end of each respective pull cable to at least one geometric panel of the plurality of interconnected geometric panels and a second end of each respective pull cable to the at least one actuator.

16. The method of claim 15, comprising:
    prior to forming the planar structure, calculating a panel geometry for each of the plurality of interconnected geometric panels, and calculating a plurality of hole locations for each of the plurality of holes.

17. The method of claim 15, comprising:
    wherein forming the planar structure includes activating a dual-extrusion 3-dimensional printer.

18. The method of claim 15, wherein each geometric panel is formed of a first material, wherein each interconnection between two respective geometric panels is formed of a second material, the method comprising:
    wherein forming each interconnection of the planar structure includes forming a dovetail joint between the first material and the second material.

19. The method of claim 15, comprising:
    upon attaching a first end of each respective pull cable to at least one geometric panel of the plurality of interconnected geometric panels and a second end of each respective pull cable to the at least one actuator, selectively activating the at least one actuator to therefore translate the planar structure from a first stable state to a second stable state.

20. The method of claim 15, wherein forming the planar structure includes forming the plurality of interconnected geometric panels such that they are foldable into a conical Kresling shape.

* * * * *